(12) United States Patent
Ducroquet

(10) Patent No.: US 8,882,121 B2
(45) Date of Patent: Nov. 11, 2014

(54) FENDER MOUNTING ASSEMBLY FOR UTILITY VEHICLES

(71) Applicant: Agco SA, Beauvais (FR)

(72) Inventor: Frederic Ducroquet, Orville (FR)

(73) Assignee: Agco SA, Beauvais (FR)

( * ) Notice: Subject to any disclaimer, the term of this patent is extended or adjusted under 35 U.S.C. 154(b) by 0 days.

(21) Appl. No.: 13/721,597

(22) Filed: Dec. 20, 2012

(65) Prior Publication Data

US 2013/0154228 A1   Jun. 20, 2013

(30) Foreign Application Priority Data

Dec. 20, 2011   (GB) .................................. 1121888.0

(51) Int. Cl.
*B62D 25/16*     (2006.01)
*B62D 25/18*     (2006.01)

(52) U.S. Cl.
CPC .............. *B62D 25/18* (2013.01); *B62D 25/186* (2013.01); *B62D 25/163* (2013.01); *B62D 25/168* (2013.01)
USPC .......................................... 280/157; 280/848

(58) Field of Classification Search
USPC ........... 280/157, 848, 851, 854, 156; 172/509
See application file for complete search history.

(56) References Cited

U.S. PATENT DOCUMENTS

| | | | | |
|---|---|---|---|---|
| 4,205,861 A * | 6/1980 | Roberts et al. | ................ | 280/851 |
| 4,377,294 A * | 3/1983 | Lockwood et al. | ........... | 280/851 |
| 4,442,477 A * | 4/1984 | Hennessey | ....................... | 362/52 |
| 5,074,573 A * | 12/1991 | Dick | .............................. | 280/157 |
| 5,169,167 A * | 12/1992 | Willson et al. | ................ | 280/157 |
| 5,511,808 A * | 4/1996 | Rowland | ....................... | 280/157 |
| 5,794,956 A * | 8/1998 | Hurlburt et al. | ............... | 280/156 |
| 5,839,743 A * | 11/1998 | Weinkauf | ....................... | 280/154 |
| 5,950,975 A * | 9/1999 | Zieske | ........................ | 248/291.1 |
| 5,975,548 A * | 11/1999 | Galli et al. | .................... | 280/157 |
| 6,053,517 A * | 4/2000 | Lodi et al. | ..................... | 280/157 |
| 6,109,621 A * | 8/2000 | Hettich et al. | ............... | 280/5.52 |
| 6,152,469 A * | 11/2000 | Gadowski | ..................... | 280/154 |
| 6,349,954 B1 * | 2/2002 | Deziel | .......................... | 280/156 |
| 6,431,605 B1 * | 8/2002 | Miller et al. | .................. | 280/854 |
| 6,502,841 B1 * | 1/2003 | Skelcher | ....................... | 280/156 |
| 6,533,323 B1 * | 3/2003 | Weaver | ......................... | 280/847 |
| 6,648,373 B2 * | 11/2003 | Hawes | .......................... | 280/854 |
| 6,799,782 B2 * | 10/2004 | Jain et al. | ..................... | 280/848 |
| 6,802,517 B1 * | 10/2004 | Wuthrich | ...................... | 280/157 |

(Continued)

FOREIGN PATENT DOCUMENTS

EP               01046573 A1    10/2000

OTHER PUBLICATIONS

Great Britian Search Report for GB Application No. 1121888.0 dated Apr. 4, 2012.

*Primary Examiner* — Jeffrey J Restifo

(57) ABSTRACT

A utility vehicle such as an agricultural tractor comprises a steerable wheel secured to a wheel carrier which is mounted to a vehicle frame. The wheel is steerable through a range of steering angles about a substantially vertical steering axis A fender is mounted above the wheel on a support arm. The support arm is fixed relative to the wheel carrier so as to pivot with the wheel during steering through the whole of said range. The fender is pivotally mounted to the support arm at a pivoting mount located above the wheel. The fender is forced to pivot with respect to the wheel and support arm when the fender engages the vehicle frame.

9 Claims, 6 Drawing Sheets

(56) References Cited

U.S. PATENT DOCUMENTS

| | | | |
|---|---|---|---|
| 6,893,048 B2* | 5/2005 | Rush et al. | 280/854 |
| 7,384,071 B2* | 6/2008 | Hartmann et al. | 280/854 |
| 7,669,798 B2* | 3/2010 | Guering et al. | 244/121 |
| 7,832,751 B2* | 11/2010 | Fischer et al. | 280/154 |
| 7,874,592 B2* | 1/2011 | Eklund et al. | 280/854 |
| 8,066,305 B2* | 11/2011 | Eklund et al. | 280/854 |
| 8,388,003 B2* | 3/2013 | Wellman et al. | 280/157 |
| 2005/0001454 A1* | 1/2005 | Rush et al. | 296/198 |
| 2006/0108765 A1* | 5/2006 | Teich | 280/157 |
| 2007/0187941 A1* | 8/2007 | Eklund et al. | 280/848 |
| 2013/0154228 A1* | 6/2013 | Ducroquet | 280/157 |

* cited by examiner

FENDER MOUNTING ASSEMBLY FOR UTILITY VEHICLES

CROSS-REFERENCE TO RELATED APPLICATION

The present application claims the benefit of and priority from United Kingdom Application No. 1121888.0, filed Dec. 20, 2011, the entire disclosure of which is hereby incorporated by reference.

FIELD OF INVENTION

The invention relates to utility vehicles such as agricultural tractors and particularly to fenders mounted on steerable wheels.

BACKGROUND

The use of fenders is well known for many types of vehicle. Fenders are employed to prevent water, mud and debris from being propelled an excessive distance from rotating tyres. Agricultural tractors and other similar utility vehicles have included fenders on front steerable wheels for many years, especially on medium and high horsepower tractors. In such arrangements, each fender typically has an independent support arm which secures the fender to the associated wheel carrier. The support arm is shaped to position the fender above the wheel. Often adjustment means are provided to cater for differently sized wheels and tyres and serve to maintain an acceptable separation between the fender and tyre.

The support arm in known arrangements is fixed to the wheel carrier so that the fender maintains a constant positional relationship with the tyre as the wheel is pivoted during steering. However one drawback faced with the inclusion of fenders is the reduction in available steering angle caused by striking of the fender on the vehicle frame at extreme steering angles. This is compounded by the common design of fenders being wider than the tyre. A simple solution to this problem has been to construct the fenders to be easily removable to allow them to be removed when greater manoeuvrability is required. This solution however is far from satisfactory and, although the cheaper option, is time consuming for the operator.

Another solution has been to mount the support arm to the wheel carrier with a sprung pivoting assembly. The pivoting assembly allows the support arm and fender to pivot with respect to the wheel carrier and tyre thus allowing the wheel to pivot to the maximum steering angle permitted by the geometry of the vehicle frame. The pivoting assembly is provided with a spring which biases the fender and support arm into the neutral position where in the fender is aligned with the tyre.

For shallow steering angles the support arm simply follows the wheel carrier and maintains a fixed relationship between the fender and tyre. At larger steering angles however the fender engages the side of the vehicle frame typically via a stop member and is forced to pivot with respect to the wheel and carrier.

To accommodate the pivoting movement of the support arm, the distance between the arm and the wheel must be sufficient. This places limitations on the placement of suspension components such as hydraulic cylinders connected between the front axle and vehicle frame. Moreover the freedom of the axle to pivot around a longitudinal axis is restricted especially when the track width is narrow.

In known arrangements the axis of pivot is substantially vertical between the support arm and wheel carrier for ease of construction. However, this arrangement also has significant limitations enforced by the limited angle through which the support arm can pivot without striking the tyre. Also, at full steering lock the separation between the support arm and tyre is minimal leading to an increased risk of large debris on the tyre striking the support arm and causing damage.

SUMMARY OF INVENTION

It is an object of the invention to provide an improved fender mounting assembly which alleviates the aforementioned problems.

It is another object of the invention to provide a fender mounting assembly suitable for use on agricultural tractors which is more robust and has improved handling of large debris carried by the tyres.

It is yet another object of the invention to provide a fender mounting assembly on a utility vehicle which improves the design freedom in relation to positioning axle suspension means.

In accordance with the invention there is provided a utility vehicle comprising a steerable wheel secured to a wheel carrier which is mounted to a vehicle frame, the wheel being steerable through a range of steering angles about a substantially vertical steering axis, and a fender mounted above the wheel on a support arm, the support arm being fixed relative to the wheel carrier so as to pivot with the wheel during steering through the whole of said range, the fender being pivotally mounted to the support arm at a pivoting mount located above the wheel, wherein the fender is forced to pivot with respect to the wheel and support arm when the fender engages the vehicle frame.

By allowing the fender to pivot with respect to the support arm and keeping the support arm fixed with respect to the wheel carrier, the spatial relationship between the support arm and the wheel is maintained at all times thus keeping a sufficient separation and avoiding damage by large debris carried on the tyre. Moreover, the support arm can be positioned much closer to the wheel compared to known arrangements having a pivoting arm thus making it easier to accommodate other components such as axle suspension components.

Preferably the arrangement further comprises biasing means which biases the fender into a normal position wherein the fender is substantially aligned with wheel. By way of example the biasing means may include a spring which acts between the fender and the support arm.

The fender may comprise a skeleton frame and a body, the skeleton being pivotally mounted to the support arm, and the body being mounted to the skeleton, by screws or bolts for example. Preferably the skeleton is formed of a ridged robust material such as steel whereas the body is preferably formed of a plastic by a moulding technique thus minimising costs.

In a preferred arrangement the fender pivots with respect to the support arm around a pivot axis which is inclined to the vertical so that, upon engagement with the frame, the fender pivots away from the wheel. Advantageously, by inclining the pivoting axis of the fender the separation between all parts of the fender and the associated wheel are maintained at a sufficient distance thus avoiding damage by large debris carried on the tyre. This is in contrast to known assemblies wherein at least one edge of the fender converges on the swept envelope of the tyre.

The fender preferably engages the vehicle frame via a stop member which is formed of a resilient material such as rubber. This stop member may be mounted on an extension member, or rod, secured to the fender to cater for different frame geometries.

It should be understood that the term 'vehicle frame' is intended to include any part of the vehicle body which engages or comes in to contact with the fender or stop member. This may include the chassis, sheet metal of the hood, or other functional or aesthetic component secured thereto.

As mentioned above, the invention improves the freedom of design of the front axle architecture. Therefore the wheel carrier may be mounted to the vehicle on the end of an axle, and a suspension cylinder may be connected between the axle and the frame. Alternatively the wheel carrier may be mounted to the frame via an independent wheels suspension assembly which includes a four-bar linkage for example.

The frame may have a concave part which receives an edge of the wheel when at a limit of the steering range, and wherein the fender engages the frame beyond the concave part. Advantageously, the provision of a concave part in the frame increases the available space for the wheel to pivot to tighter steering angles.

Preferably the support arm is shaped to position the fender pivoting mount forwardly of the centre of the wheel hub.

The support arm may be adjustable in a direction parallel to the axis of rotation of the wheel to cater for different sized wheels.

The invention lends itself particularly well to agricultural tractors having steerable front wheels mounted either side of a hood and disposed forwardly of a cab. However it should be appreciated that the invention is also applicable to other utility vehicles which employ fenders on steerable wheels and suffer from angular limitations enforced by a vehicle frame.

BRIEF DESCRIPTION OF DRAWINGS

Advantages of the invention will become apparent from reading the following description of a specific embodiment with reference to the appended drawings in which.

DESCRIPTION OF EXAMPLE EMBODIMENT

Figure 1:
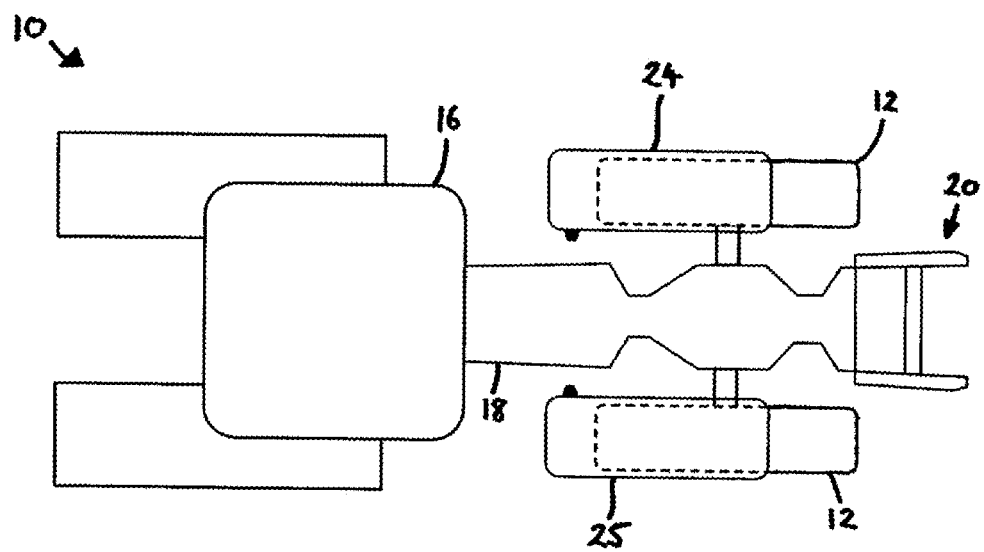
FIG. 1 is a schematic plan view of an agricultural tractor in accordance with an embodiment of the invention.
Figure 2:
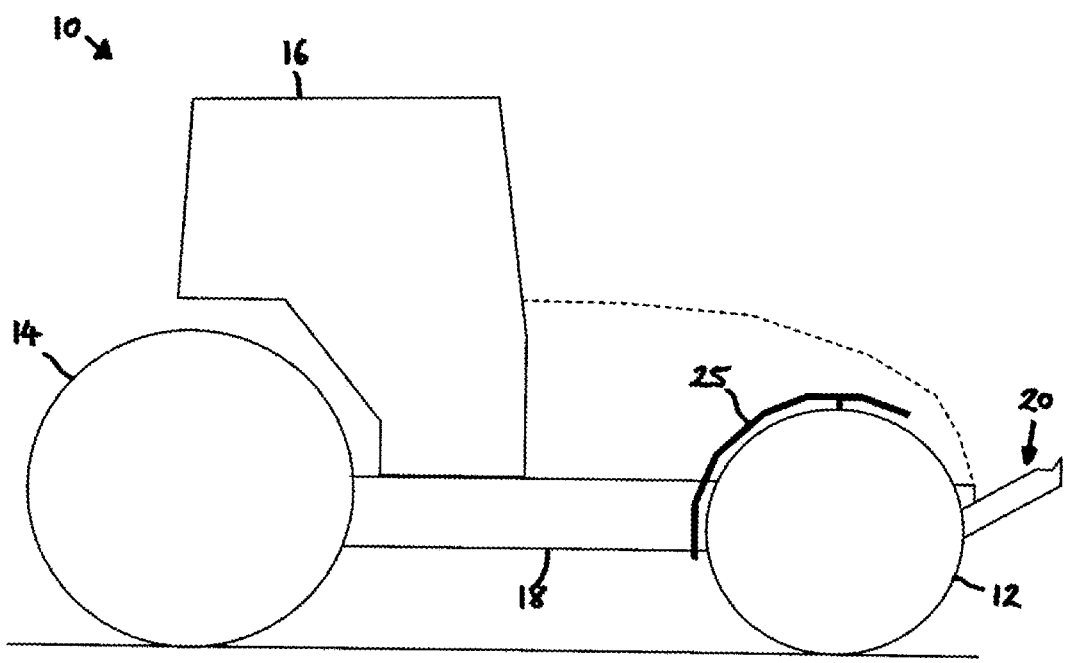
FIG. 2 is a schematic side elevation of the tractor of FIG. 1.
Figure 3:
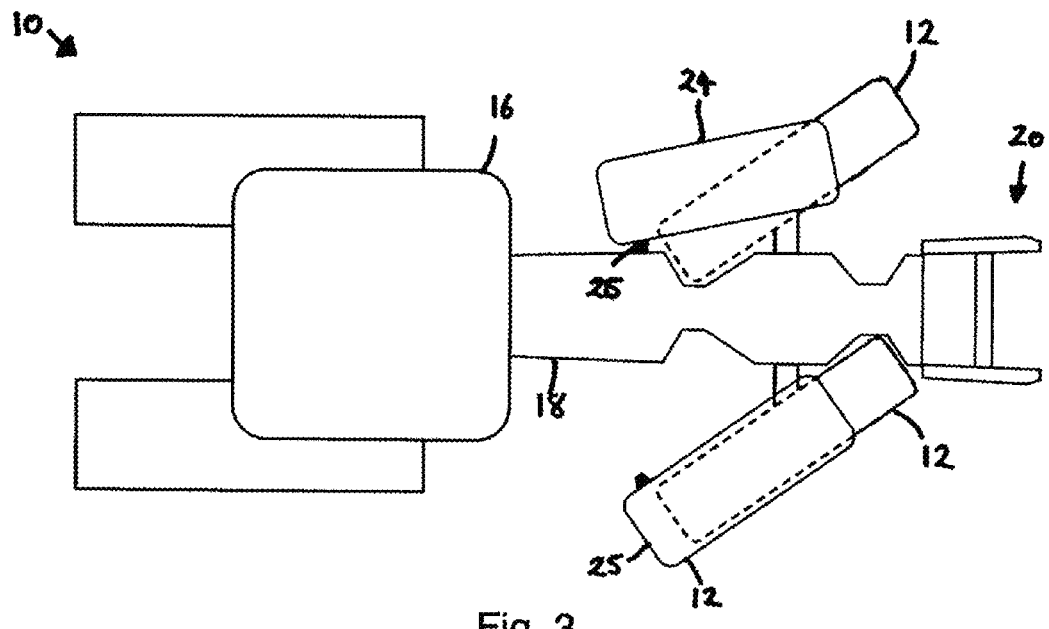
FIG. 3 is a schematic plan view of the tractor of FIG. 1 showing the steerable wheels at full left-hand steering lock.

With reference to FIGS. 1, 2 and 3, an agricultural tractor 10 includes a pair of front wheels 12, a pair of rear wheels 14, a driver's cab 16 and a frame 18. The driver's cab 16 is mounted or suspended upon the frame 18. Shown in highly simplified form in FIGS. 1, 2 and 3, frame 18 may include the housing for a transmission and a clutch as per conventional agricultural tractors. The frame 18 may continue forwardly of the cab 16 and provide a support structure for an engine (not shown). In some vehicles, the engine block itself forms part of the frame and may be integrated with the transmission housing.

A front linkage assembly 20 is also shown in FIGS. 1, 2 and 3 mounted to the front of frame 18. The front wheels 12 are mounted in a known manner to respective ends of a front axle 22 which is suspended in a known manner from frame 18. Each front wheel 12 has associated therewith a fender 24, 25 which are each supported by a respective support arm (not shown in FIGS. 1 to 3) to maintain a positional relationship with respect to the associated front wheel 12.

The general principle of a pivoting fender 24 is illustrated in FIG. 3 in which a stop 26 engages with the side of frame 18 at extreme steering angles (to the left in this case). It can be seen from FIG. 3 that the right-hand fender 25 is maintained in a normal position. It will be appreciated that right-hand fender 25 pivots with respect to the associated front wheel 12 for high steering angles to the right.

A more detailed description of the construction of the fender assembly will now be described with reference to FIGS. 4 to 11. The following description will be made with reference to the left-hand front fender 24 and the figures omit the right-hand assembly for clarity. However it should be understood that the construction of the right-hand fender assembly will mirror that of the left.

Figure 4:
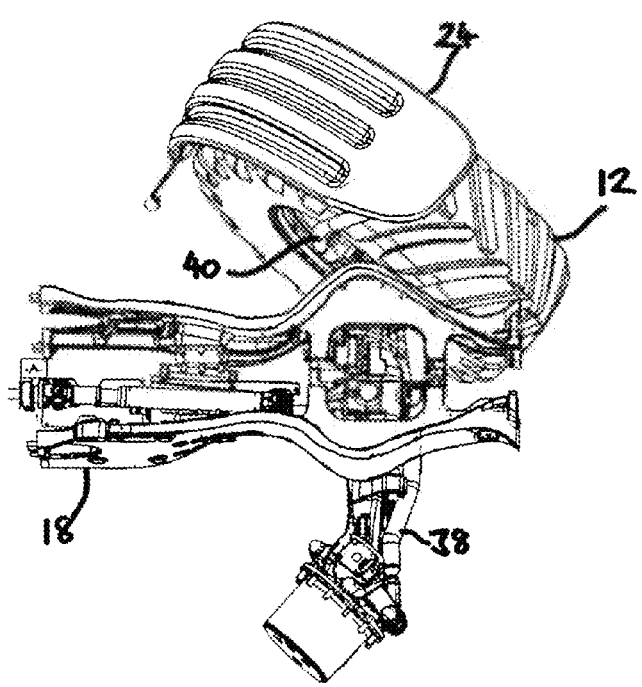
FIG. 4 is a detailed perspective view of a fender mounting assembly in accordance with an embodiment of the invention showing part of the vehicle frame and front axle with the wheel shown at full right-hand steering lock.
Figure 8:
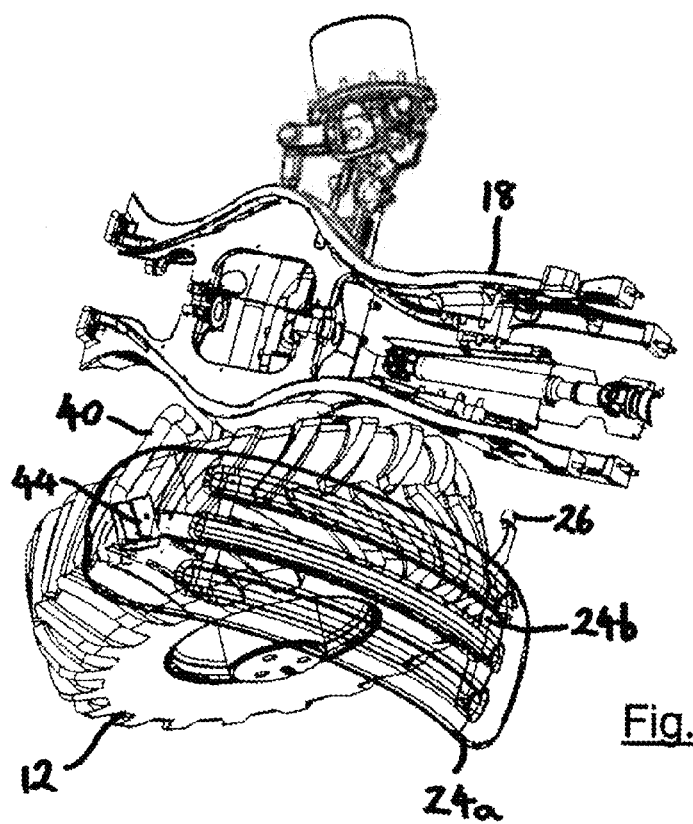
Figure 9:
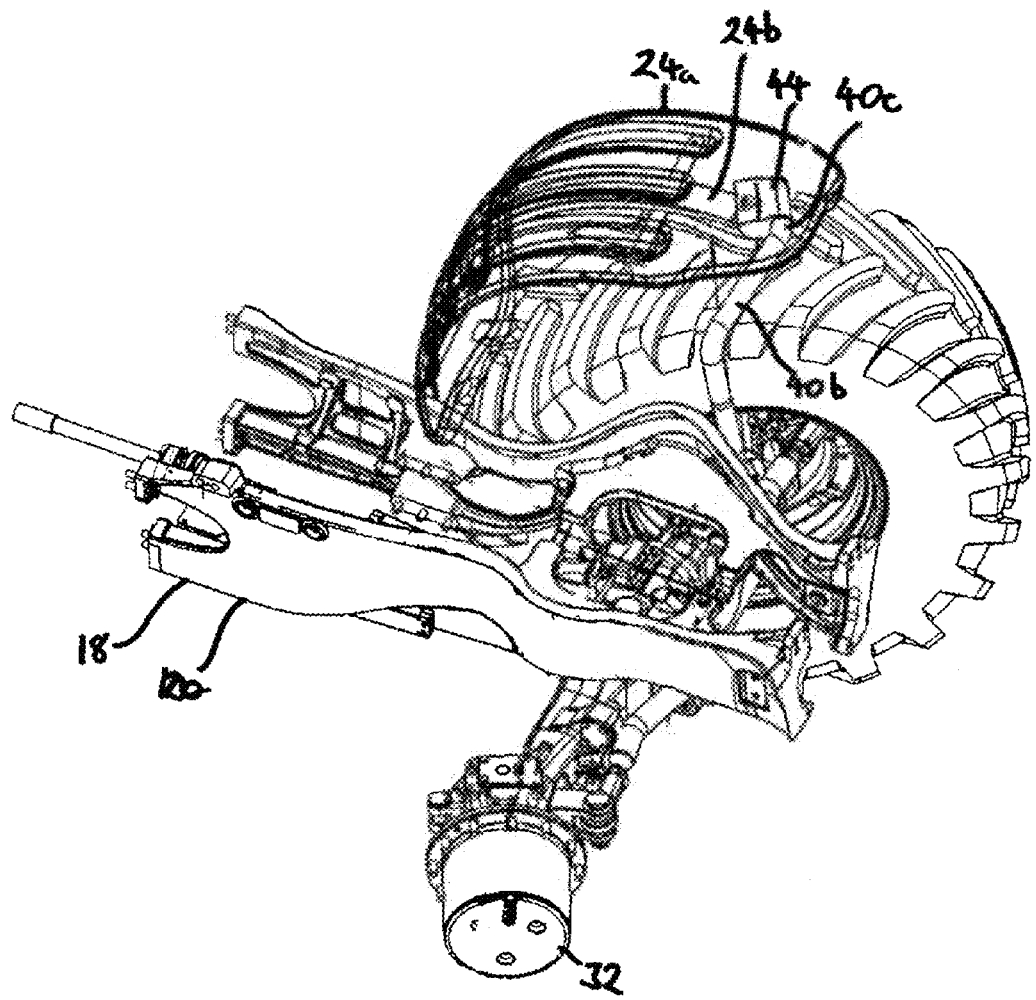
Figure 10:
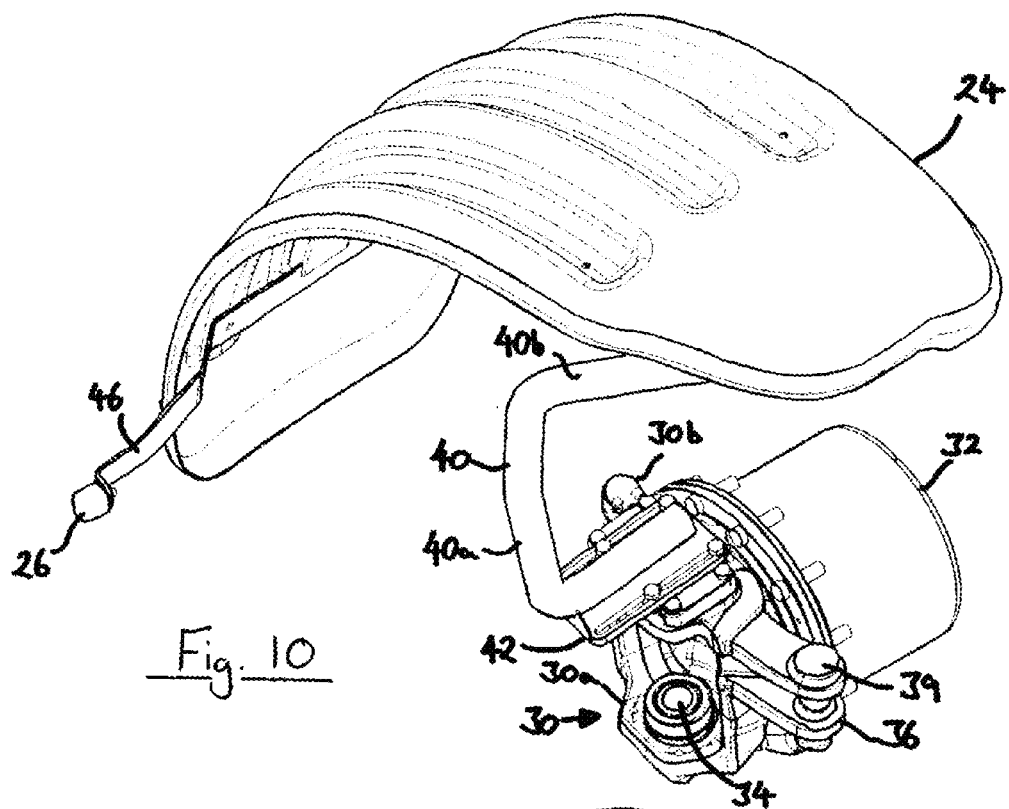
FIGS. 10 and 11 show the fender mounting assembly of FIGS. 4 to 9 showing the fender, support arm and wheel carrier in isolation and showing the support arm adjusted in two different positions respectively.
Figure 11:
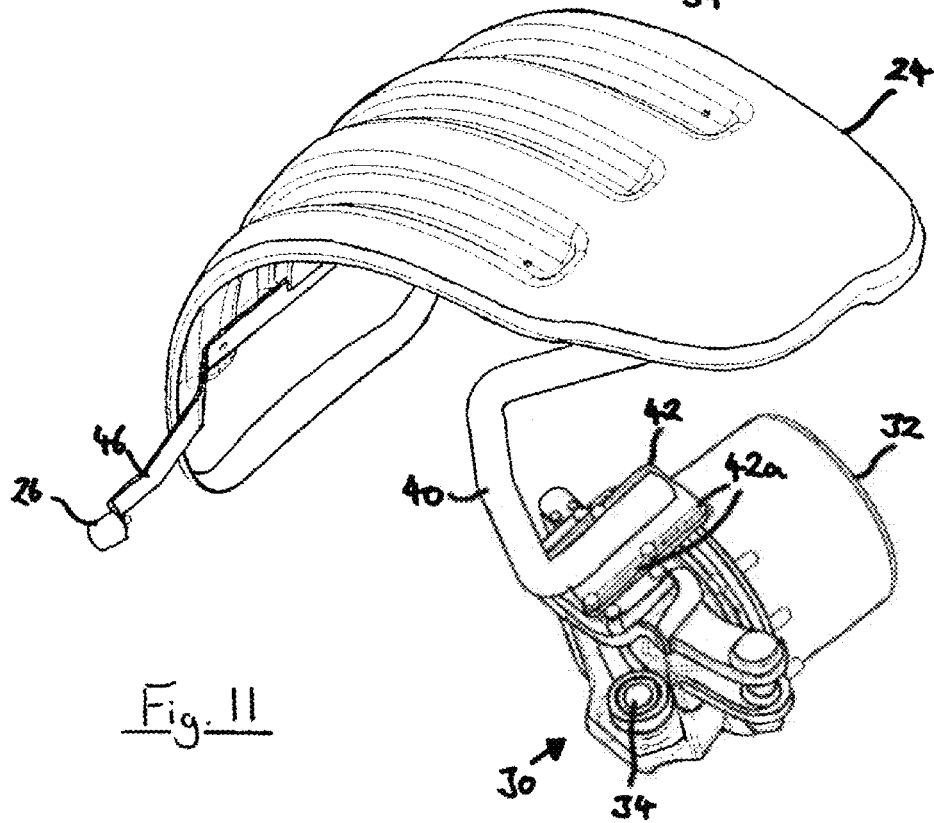

With particular reference to FIGS. 10 and 11, a wheel carrier designated generally at 30 has a lower principle part 30a, an upper principle part 30b, and a wheel hub 32. The wheel carrier 30 pivots about a steering axis defined by king pin 34. The wheel hub 32 may be driven by means of a reduction gear that is accommodated in it's interior, for which purpose the input shaft (not shown) of said wheel hub 32 is connected to the vehicle transmission via a driveshaft housed in axle 22. The wheel carrier 30 is also provided with an arm 36 to which a steering rod 38 is connected by a vertical pin 39. A hydrostatic steering device (not shown) controls movement of the steering rod 38 so as to swivel the wheel carrier 30 about the steering axis into the desired direction of travel. For instance, FIG. 4 shows the wheel carriers 30 steered to the right whilst FIGS. 5 to 9 show the wheel carrier 30 steered fully to the left.

A support arm 40 is welded at it's lower end to mounting plate 42 which is bolted to the upper part 30b of wheel carrier 30. As shown in FIGS. 10 and 11, the plate 42 is provided with elongated slots 42a which allow adjustment of the fender 24 in direction parallel to the rotation axis of wheel 12.

Figure 5:
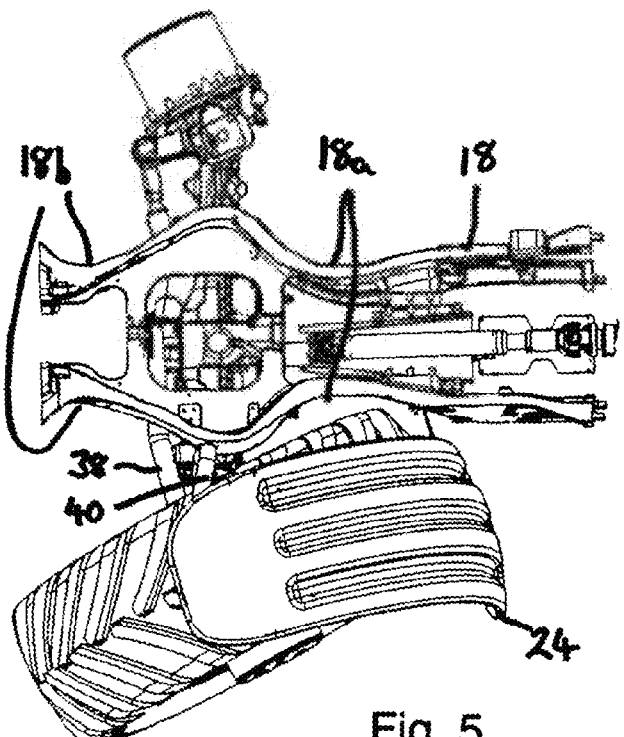
FIG. 5 is a plan view of the fender mounting assembly of FIG. 4 showing the wheel at full left-hand lock.
Figure 6:
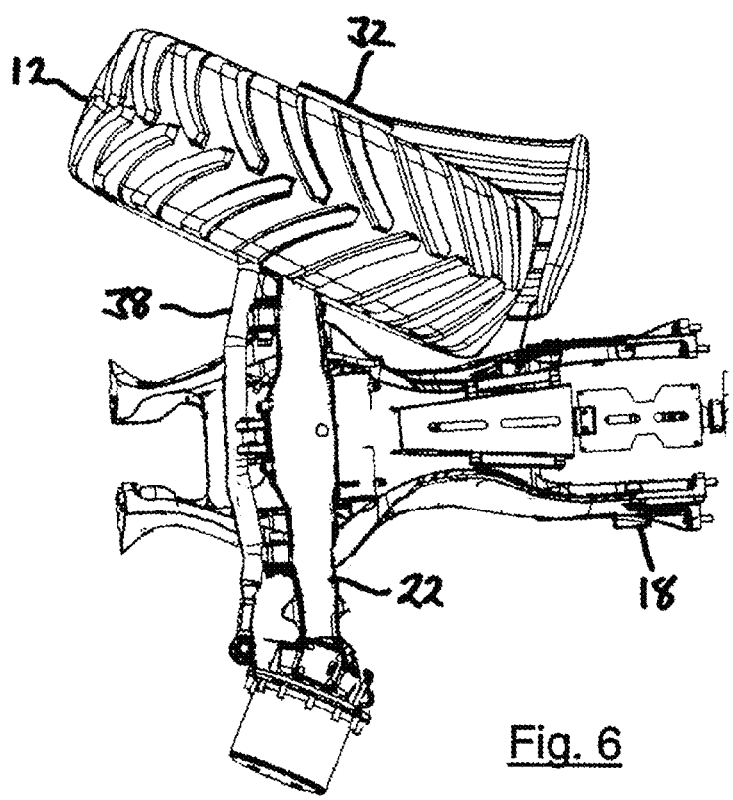
FIG. 6 is an underside view of the assembly of FIG. 5.
Figure 7:
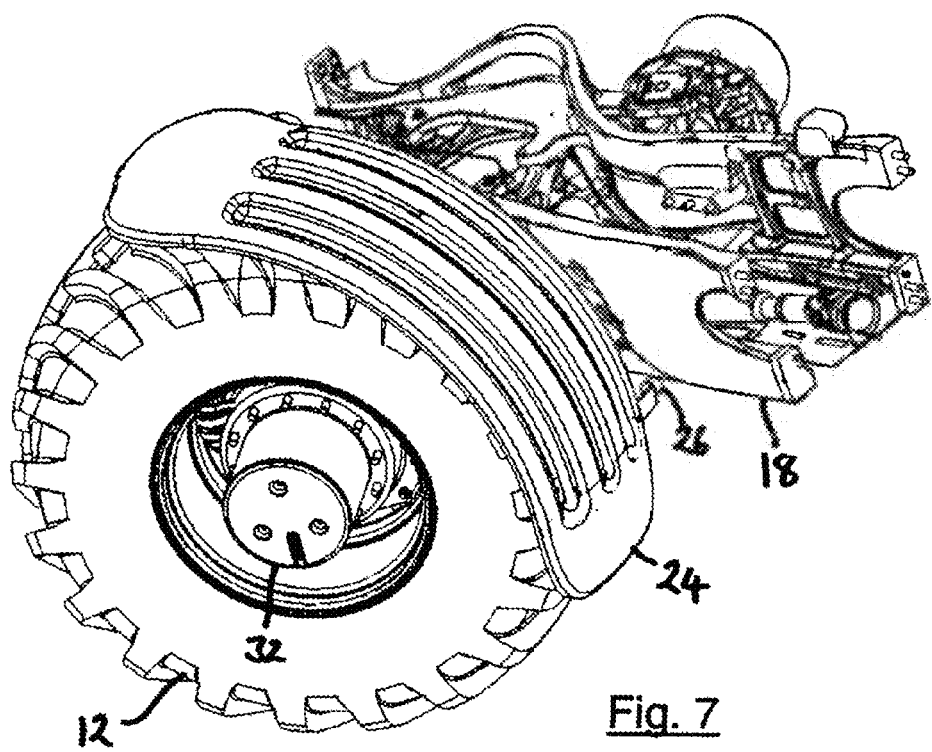
FIGS. 7, 8 and 9 show various perspective views of the assembly of FIG. 5 with the wheel shown at full left-hand lock.

The support arm 40 includes an upright part 40a, an angled part 40b extending forwardly, outwardly and upwardly from the upright part 40a, and a transverse part 40c which includes part of a pivoting bracket 44 for fender 24. With particular reference to FIGS. 8 and 9, fender 24 includes a plastic moulded body part 24a and a rigid metal skeleton frame 24b. The skeleton frame 24b is pivotally mounted at its forward end to support arm 40 by pivoting bracket 44. The pivoting bracket 44 allows the fender 24 to pivot between a normal position (FIG. 4) and a displaced position (FIG. 5). Biasing means (not shown) act between the fender 24 and support arm 40 to bias the fender 24 into the normal position shown in FIG. 4.

The axis around which fender 24 pivots on support arm 40 is inclined to the vertical so that the rear edge of fender 24 moves upwardly and outwardly away from wheel 12. At maximum steering angle this increase separation between the fender 24 and wheel 12 and has little effect on the function of fender 24 because debris thrown up by the wheel is not directed at the windows cab 16 but is instead shielded by frame 18.

Fender 24 includes a stop 26 mounted on an end of a stop arm 46. At large steering angles to the left, stop 26 engages with the side of frame 18 which prevents the fender 24 from contacting the frame 18. The continued steering force provided by steering rod 38 forces the fender 24 to pivot with respect to the support arm 40 as shown in FIG. 5 for example. This prevents the fender 24 from limiting the steering angle achievable.

The frame 18 includes a pair of rear concave parts 18a disposed behind the axle 22 and a pair of front concave parts 18b disposed in front of the axle 22. These concave parts allow for an increased steering angle and receive the rear and front edges respectively of the wheel 12 at maximum steering angles.

Although described in relation to an agricultural tractor 10 it is envisaged that the fender mounting arrangement described may be employed on other utility vehicles with steerable front wheels without deviating from the scope of the invention.

Furthermore, although the pivot axis of the Fender has been described as inclined to the vertical, a vertical pivot axis may be employed although it is envisaged that this will result in an inferior arrangement to that described above.

The invention claimed is:

1. A utility vehicle comprising a steerable wheel secured to a wheel carrier which is mounted to a vehicle frame, the wheel being steerable through a range of steering angles about a substantially vertical steering axis, and a fender mounted above the wheel on a support arm, the support arm being fixed relative to the wheel carrier so as to pivot with the wheel during steering through the whole of said range, the fender being pivotally mounted to the support arm at a pivoting mount located above the wheel, wherein the fender is forced to pivot with respect to the wheel and support arm when the fender engages the vehicle frame.

2. A utility vehicle according to claim 1, wherein the fender pivots with respect to the support arm around a pivot axis which is inclined to the vertical so that, upon engagement with the frame, the fender pivots away from the wheel.

3. A utility vehicle according to claim 1, further comprising biasing means which bias the fender to a normal position wherein the fender is substantially aligned with the wheel.

4. A utility vehicle according to claim 1, wherein the fender comprises a skeleton and a body, the skeleton being pivotally mounted to the support arm, and the body being mounted to the skeleton.

5. A utility vehicle according to claim 1, wherein the fender engages the vehicle frame via a stop member which is formed of a resilient material.

6. A utility vehicle according to claim 5, wherein the stop member is mounted on an extension member secured to the fender.

7. A utility vehicle according to claim 1, wherein the support arm is shaped to position the fender pivoting mount forwardly of the centre of the wheel hub.

8. A utility vehicle comprising a steerable wheel secured to a wheel carrier which is mounted to a vehicle frame, the wheel being steerable through a range of steering angles about a substantially vertical steering axis, and a fender mounted above the wheel on a support arm, the support arm being fixed relative to the wheel carrier so as to pivot with the wheel during steering through the whole of said range, the fender being pivotally mounted to the support arm at a pivoting mount located above the wheel, wherein the fender is forced to pivot with respect to the wheel and support arm when the fender engages the vehicle frame, wherein the frame has a concave part which receives an edge of the wheel when at a limit of the steering range, and wherein the fender engages the frame beyond the concave part.

9. A utility vehicle comprising a steerable wheel secured to a wheel carrier which is mounted to a vehicle frame, the wheel being steerable through a range of steering angles about a substantially vertical steering axis, and a fender mounted above the wheel on a support arm, the support arm being fixed relative to the wheel carrier so as to pivot with the wheel during steering through the whole of said range, the fender being pivotally mounted to the support arm at a pivoting mount located above the wheel, wherein the fender is forced to pivot with respect to the wheel and support arm when the fender engages the vehicle frame, wherein the support arm is adjustable in a direction parallel to the axis of rotation of the wheel.

* * * * *